United States Patent
Lu et al.

(10) Patent No.: US 11,606,165 B2
(45) Date of Patent: Mar. 14, 2023

(54) METHOD, MEDIUM, PROGRAM PRODUCT, AND MODEM FOR SETTING MODULATION MODES

(71) Applicant: ARRIS Enterprises LLC, Suwanee, GA (US)

(72) Inventors: Wei Lu, Shenzhen (CN); Bei Li, Shenzhen (CN); Jing Xiao, Shenzhen (CN); Jing Sun, Shenzhen (CN); Xuebo Chen, Shenzhen (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/573,188

(22) Filed: Jan. 11, 2022

(65) Prior Publication Data

US 2022/0224435 A1     Jul. 14, 2022

(30) Foreign Application Priority Data

Jan. 12, 2021   (CN) .......................... 202110037173.0

(51) Int. Cl.
   *H04L 1/00*     (2006.01)
   *H04L 12/28*    (2006.01)
   *H04L 27/34*    (2006.01)

(52) U.S. Cl.
   CPC ........ *H04L 1/0003* (2013.01); *H04L 12/2801* (2013.01); *H04L 27/34* (2013.01)

(58) Field of Classification Search
   CPC .... H04L 1/0003; H04L 12/2801; H04L 27/34
   See application file for complete search history.

(56) References Cited

U.S. PATENT DOCUMENTS

| | | | | |
|---|---|---|---|---|
| 2007/0121737 A1* | 5/2007 | Yoshii | ................. | H04L 27/2618 375/260 |
| 2013/0121179 A1* | 5/2013 | Dang | .................... | H04L 1/0015 370/252 |
| 2017/0359742 A1* | 12/2017 | Kawada | ................ | H04L 1/0003 |

FOREIGN PATENT DOCUMENTS

| | | | | |
|---|---|---|---|---|
| EP | 1455547 A1 * | 9/2004 | ........... | H04L 1/0003 |
| WO | WO-9837710 A2 * | 8/1998 | ........... | H04L 1/0003 |

OTHER PUBLICATIONS

International Search Report and the Written Opinion of the International Searching Authority dated Apr. 13, 2022 in International (PCT) Application No. PCT/US2022/011946.

(Continued)

*Primary Examiner* — Freshteh N Aghdam
(74) *Attorney, Agent, or Firm* — Wenderoth, Lind & Ponack, L.L.P.

(57) ABSTRACT

The present disclosure relates to a method, a medium, a program product, and a modem for setting modulation modes. The method includes detecting by a modem whether a modulation mode of the modem is inverted, the modem being capable of operating in a plurality of modulation modes, and each modulation mode having a different modulation order; and in response to the determination that the number of times of inversion of the modulation mode within a first predetermined time has reached a threshold, setting by the modem the modulation mode of the modem to a modulation mode other than a modulation mode with the highest modulation order in all modulation modes included in the inversion process and maintaining the set modulation mode for a second predetermined time. By the above method, the modulation mode is prevented from repeatedly inverting, thereby maintaining the downstream data throughput at a high level.

20 Claims, 6 Drawing Sheets

(56) References Cited

OTHER PUBLICATIONS

Koetz Hendrik et al: "Efficient Adaptation of Modulation and Coding Schemes in High Quality Home Networks", Feb. 23, 2011 (Feb. 23, 2011), Advances in Biometrics : International Conference, ICB 2007, Seoul, Korea, Aug. 27-29, 2007 ; Proceedings; [Lecture Notes in Computer Science; Lect.Notes Computer], Springer, Berlin, Heidelberg, pp. 81-91, XP047406998.

\* cited by examiner

METHOD, MEDIUM, PROGRAM PRODUCT, AND MODEM FOR SETTING MODULATION MODES

TECHNICAL FIELD

The present disclosure relates to the field of network communication, and more specifically, to a method, a medium, a program product, and a modem for setting a modulation mode in the field of network communication.

BACKGROUND ART

Modems are used more and more widely as an important access device. Various user devices, such as smart phones, notebook computers, desktop computers, digital set top boxes, and smart TVs, can be connected to the modem through at least one of the wireless or wired methods, so as to access various services and applications in external networks including packet data networks, the Internet, and cellular networks through signal transmission between the modem and the Cable Modem Terminal System (CMTS).

When the modem adopts OFDM (Orthogonal Frequency Division Multiplexing) modulation, in order to correctly transmit information bits as quickly as possible, the modem can select a suitable mode from a plurality of modulation modes (modulation profiles) (hereinafter referred to as "modes") in which it can work to transmit signals according to the quality of the channel between the modem and the CMTS. Each modulation mode uses a different modulation order, so that each modulation operation can carry a different number of bits. For example, when the channel quality is high, the modem may use a modulation mode with a higher order, so that it can carry more bits per modulation. Conversely, when the channel quality is low, as the signal is greatly affected by noise, an intolerable codeword error rate (or bit error rate) may occur in a modulation mode with a higher order, it is necessary to use a modulation mode with a lower order to transmit the signal correctly.

In the current modulation mode (hereinafter referred to as "working mode"), the modem determines the codeword error rate related to the current modulation mode by calculating the ratio of the number of codeword errors obtained by demodulation of the signal sent by the CMTS to the total number of codewords sent by the CMTS under the cable-mac corresponding to the modem. When the calculated codeword error rate exceeds a threshold, the modem switches to a modulation mode with a lower order. In addition, no matter which modulation mode the modem is currently working in, the CMTS may also send test data under each modulation mode to the modem, so that the modem can determine the codeword error rate of the related mode by calculating the ratio of the number of codeword errors obtained by demodulation of the test data sent by the CMTS to the total number of codewords sent by the CMTS under the cable-mac corresponding to the modem, and switch to a modulation mode with a higher order when the codeword error rate of the modulation mode with a higher order is acceptable.

For example, the modem can work in a plurality of modulation modes including mode 0 using 256 QAM, mode 1 using 1024 QAM, mode 2 using 4096 QAM, etc. As the modulation order of QAM becomes higher, the modulation order of the modulation mode becomes higher, and the number of bits that can be carried per modulation increases. When the modem is working in a high-order modulation mode such as mode 2, if the channel noise is higher, the modem may detect a higher codeword error rate or bit error rate and a higher packet loss. When these statistical data exceed the threshold, the modem will switch to a low-order modulation mode such as mode 0 or mode 1, followed by an increase in downstream data throughput in the direction from the CMTS to the modem. In the low-order modulation mode, the codeword error rate calculated by the modem based on the test data sent by the CMTS in the high-order modulation mode may decrease. When it is smaller than the threshold, the modem switches back to the high-order modulation mode, followed by a decrease in the downstream data throughput due to the channel noise existing objectively. Then, the modem detects a large codeword error rate in the high-order modulation mode, and switches back to the low-order modulation mode, resulting in an increase in the downstream data throughput. Then, in the low-order modulation mode, as the codeword error rate related to the high-order modulation mode calculated based on the test data decreases, the modem switches to the high-order modulation mode again, and then switches to the low-order modulation mode due to the channel noise, resulting in a decrease in the downstream data throughput, and so on. In this way, the modulation mode of the modem will invert back and forth between the low-order mode and the high-order mode, and the data throughput will vary back and forth accordingly.

The main reason for this inversion is the way the modem calculates the codeword error rate. For any modulation mode, the corresponding codeword error rate is the ratio of the number of codeword errors in that modulation mode to the total number of codewords sent by the CMTS under the same cable-mac. When a certain mode is a working mode of the modem, the number of codeword errors is determined based on a large amount of user communication data. When the mode is a mode used by the test data, as the test data is much less than the user communication data, the number of codeword errors is much less than the number of codeword errors based on the user communication data even though the number of codeword errors may be much more than the total test data. In addition, the total number of codewords sent by the CMTS under the same cable-mac is almost the same regardless of calculating the codeword error rate under the working mode or the codeword error rate under the test data. As a result, in the same modulation mode, the codeword error rate based on the user communication data is high, while the codeword error rate based on test data is low. Hence, when the high-order mode is used as the working mode, there may be a high codeword error rate, while there may be a low codeword error rate when the high-order mode is used as a test data mode, leading to constant inversion of the modulation mode and making the downstream data throughput unstable.

Therefore, it is desirable to provide a way to maintain a high downstream data throughput when the modulation mode is inverted.

SUMMARY OF THE INVENTION

Some aspects of the present disclosure relate to a modem. The modem may include: a memory, in which an instruction is stored; and a processor, configured to execute the instruction stored in the memory to cause the modem to execute the following operations. The operations include: detecting whether a modulation mode of the modem is inverted, the modem being capable of operating in a plurality of modulation modes, and each modulation mode having a different modulation order; and in response to the determination that the number of times of inversion of the modulation mode within a first predetermined time has reached a threshold, setting the modulation mode of the modem to a modulation mode other than a modulation mode with the highest modulation order in all modulation modes included in the inversion process and maintaining the set modulation mode for a second predetermined time.

In some embodiments, the modulation mode may correspond to QAM-based OFDM modulation, and the modulation order of the modulation mode may be the modulation order of QAM.

In some embodiments, it may be determined that an inversion of the modulation mode has occurred when it is detected that the modulation mode of the modem is switched from a modulation mode of a first modulation order to a modulation mode of a second modulation order, and then to a modulation mode of a third modulation order to determine that an inversion of modulation mode occurs, wherein the second modulation order is smaller than each of the first modulation order and the third modulation order.

In some embodiments, the modulation mode of the modem may be set to a modulation mode with the lowest modulation order included in the last inversion.

In some embodiments, the modulation mode of the modem may be set to a modulation mode with the lowest modulation order in all modulation modes included in the inversion process. For example, the modulation mode of the modem is set to the modulation mode with the lowest modulation order in all the modulation modes included in the inversion process if during the inversion process, there is a switch from a modulation mode with the lowest modulation order included in the last inversion to a modulation mode with the lowest modulation order in all the modulation modes.

In some embodiments, after the expiration of the second predetermined time, if a test result of a modulation mode with a modulation order higher than the modulation order of the set modulation mode by the modem satisfies a switching condition, the modulation mode of the modem will be switched from the set modulation mode to the modulation mode with the modulation order higher than the modulation order of the set modulation mode.

Other aspects of the present disclosure relate to a method, a non-transitory computer-readable medium, and a computer program product for setting a modulation mode. They all can realize the operations that can be executed by the modem.

BRIEF DESCRIPTION OF THE ATTACHED DRAWINGS

For a better understanding of the present disclosure and to show how to realize the present disclosure, examples are herein described with reference to the attached drawings, wherein.

SPECIFIC EMBODIMENTS

The following detailed description is made with reference to the attached drawings, and the following detailed description is provided to facilitate comprehensive understanding of various exemplary embodiments of the present disclosure. The following description includes various details for facilitation of understanding. However, these details are merely considered as examples, not for limiting the present disclosure. The present disclosure is defined by the attached claims and their equivalents. The words and phrases used in the following description are only used to enable a clear and consistent understanding of the present disclosure. In addition, for clarity and brevity, descriptions of well-known structures, functions, and configurations may be omitted. Those of ordinary skill in the art will realize that various changes and modifications can be made to the examples described in the present specification without departing from the gist and scope of the present disclosure.

Figure 1:
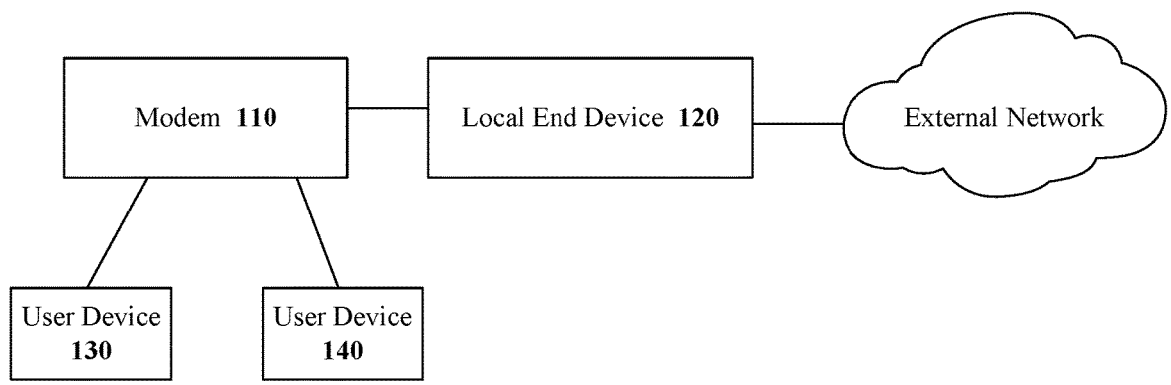
FIG. 1 is a schematic diagram of a network environment in which a modem according to an embodiment of the present disclosure is located.

First, referring to FIG. 1, it is a schematic diagram of a network environment 100 in which a modem 110 according to an embodiment of the present disclosure is located.

The modem 110 is connected to a local end device 120 such as the CMTS through a cable. User devices 130 and 140 are connected to the modem 110 in a wireless manner such as WiFi. The modem 110 modulates user data received from the user devices 130 and 140 according to a working mode, and sends modulated signals to the local end device 120 for transmission to an external network. The local end device 120 sends data received from the external network and destined for the user devices 130 and 140 to the modem 110 according to the working mode of the modem 110 for demodulation and then to the user devices 130 and 140. The local end device 120 may also send test data for testing the performance of an unused modulation mode to the modem 110 for it to evaluate whether other modulation modes can be used. When a modulation mode with a higher order has acceptable performance (for example, a low codeword error rate), the modem 110 may switch to a modulation mode with a higher order. In addition, the local end device 120 and the modem 110 also exchange management and signaling data as in the related art. In this way, the modem 110 can know how much data the local end device 120 has sent under the cable-mac where it is located, and can calculate the codeword error rate (or bit error rate) accordingly.

Although only two user devices are shown in FIG. 1, there may be more user devices, and they may be connected to the modem 110 in a wireless and/or wired manner. In addition, although only one modem 110 is shown in FIG. 1, the local end device 120 may be connected to a plurality of modems. These modems connected with the local end device 120 may be under the same cable-mac or under different cable-macs.

The modem 110 may work in a plurality of modulation modes, and each modulation mode has a different order. For example, the modulation mode may correspond to QAM (Quadrature Amplitude Modulation)-based OFDM modulation. For example, a first mode may be an OFDM modulation using 256 QAM, a second mode may be an OFDM modulation using 1024 QAM, and a third mode may be an OFDM modulation using 4096 QAM. Of course, there may also be other modulation modes, such as an OFDM modulation of 64 QAM. The higher the order of QAM, the higher the order of the modulation mode, and the more bits that can be carried per OFDM modulation. As a result, the faster the information transmission rate is and the weaker the anti-noise ability is.

Figure 2:
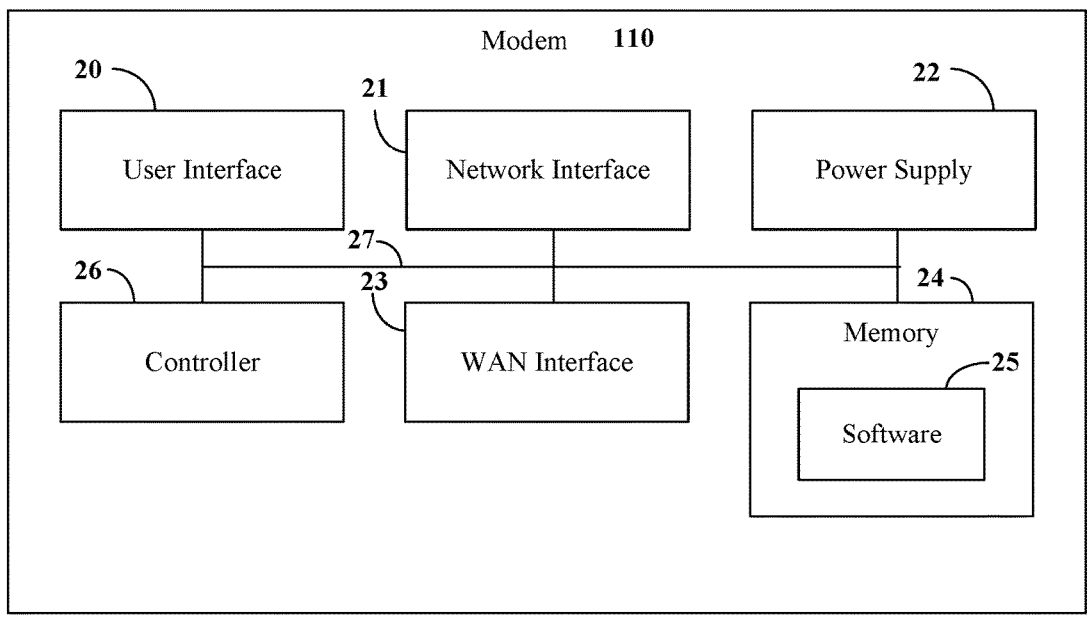
FIG. 2 is an exemplary configuration block diagram of the modem in FIG. 1 according to an embodiment of the present disclosure.

The modem 110 may be configured using the exemplary structure shown in FIG. 2.

Although it is referred to as a modem herein, the modem 110 may be, for example, a hardware electronic device that can combine the functions of a modem, an access point, and/or a router. The present disclosure further proposes that the modem 110 may include, but is not limited to, functions of a smart media device (SMD) or an IP/QAM set top box (STB) that can decode audio/video contents and play contents provided by OTT or MSO.

As shown in FIG. 2, the modem 110 includes a user interface 20, a network interface (for example, a LAN interface) 21, a power supply 22, a WAN interface 23, a memory 24, and a controller 26. The user interface 20 may include, but is not limited to, a button, a keyboard, a keypad, LCD, CRT, TFT, LED, HD or other similar display devices, including a display device with a touch screen capability that enables interaction between a user and the modem 110. The network interface 21 may comprise various types of network cards and circuit systems realized by software and/or hardware so as to be able to communicate with a wireless extender device and a client device using one or more wireless protocols. The wireless protocol is, for example, any IEEE 802.11 Wi-Fi protocol, Bluetooth protocol, Bluetooth Low Energy (BLE) or other short-distance protocols operated in accordance with wireless technology standards to use any licensed or unlicensed frequency band (for example, the Citizen Broadband Radio Service (CBRS) band, 2.4 GHz band, 5 GHz band, or 6 GHz band), RF4CE protocol, ZigBee protocol, Z-Wave protocol, or IEEE 802.15.4 protocol to exchange data over a short distance.

The power supply 22 supplies power to internal components of the modem 110 through an internal bus 27. The power supply 22 may be a self-contained power source such as a battery pack, and it has an interface which is powered by (for example, directly or through other devices) an electrical charger connected to a socket. The power supply 22 may further include a rechargeable battery that is detachable for replacement, for example, NiCd, NiMH, Li ion or Li polymer battery. When the modem 110 is a modem or a gateway device, it may include the WAN interface 23. The WAN interface 23 may include various network cards and circuits realized by software and/or hardware so as to realize the communication between the gateway device and an Internet service provider or a multi-system operator (MSO).

The memory 24 includes a single memory or one or more memories or storage locations, including but not limited to a random access memory (RAM), a dynamic random access memory (DRAM), a static random access memory (SRAM), a read-only memory (ROM), EPROM, EEPROM, ROM, a flash memory, FPGA logic block, a hard disk, or any other layers of a memory hierarchy. The memory 24 may be used to store any type of instructions, software or algorithms, including software 25 for controlling general functions and operations of the modem 110.

The controller 26 controls the general operations of the modem 110 and executes the administrative functions related to other devices in the network (for example, extenders and client devices). The controller 26 may include, but is not limited to, a CPU, a hardware microprocessor, a hardware processor, a multi-core processor, a single-core processor, a microcontroller, an application-specific integrated circuit (ASIC), a DSP, or other similar processing devices, which can execute any type of instructions, algorithms, or software for controlling the operations and functions of the AP 110 according to the embodiments described in the present disclosure. The processor 26 may include various realizations of a digital circuit system, an analog circuit system, or a mixed signal (combination of analog and digital) circuit system that executes functions in a computing system. The controller 26 may comprise, for example, a circuit such as an integrated circuit (IC), a portion or circuit of a separate processor core, an entire processor core, a separate processor, a programmable hardware device such as a field programmable gate array (FPGA), and/or a system comprising a plurality of processors.

The internal bus 27 may be used to establish communication between the components of the modem 110 (for example, 20 to 22, 24, and 26).

Due to the influence of channel noise, when the codeword error rate determined by the modem 110 in the current working mode is higher than a threshold, the modem 110 will switch from the current working mode to a lower order mode. When the codeword error rate corresponding to a higher order mode determined by the modem 110 based on the test data sent by the local end device 120 decreases and becomes lower than the threshold, it may switch back to the higher order mode to improve transmission efficiency. However, under the influence of the channel noise existing objectively, the modem 110 may continue to switch to a lower order mode, and switch back to the higher order mode under the influence of the test data, and so on, inverting continuously.

Figure 3:
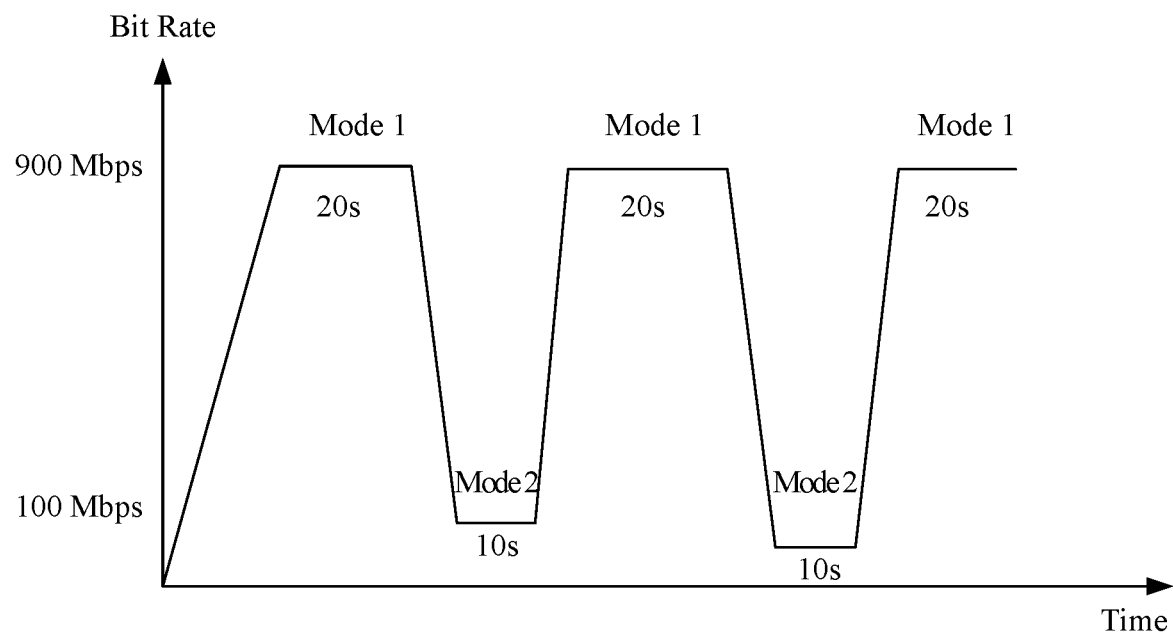
FIG. 3 is a schematic diagram of changes in downstream data throughput during modulation inversions in the related art.

FIG. 3 is a schematic diagram of changes in downstream data throughput during continuous modulation inversions in the related art.

As shown in FIG. 3, in the related art, when the modem 110 is in a high-order mode (for example, mode 2), the modem 110 has a bit rate of almost 0 at the beginning due to large channel noise. As a result, the modem 110 switches to a low-order mode, such as mode 1. In mode 1, the bit rate is increased to almost 900 Mbps and lasts for a period of time, for example, 20 seconds. Then, due to the design problem of calculating the codeword error rate, the codeword error rate calculated based on the test data is lower than the threshold. As a result, the modem 110 switches back to mode 2. Due to the objectively existing large channel noise, the data throughput drops to a position close to 0 and lasts for a period of time, for example, 10 seconds. Then, the modem 110 switches back to mode 1, and the data throughput rises accordingly. Then, the modem 110 switches to mode 2 again and the data throughput drops, and then switches to mode 1 and the data throughput rises, and so on.

Figure 4:
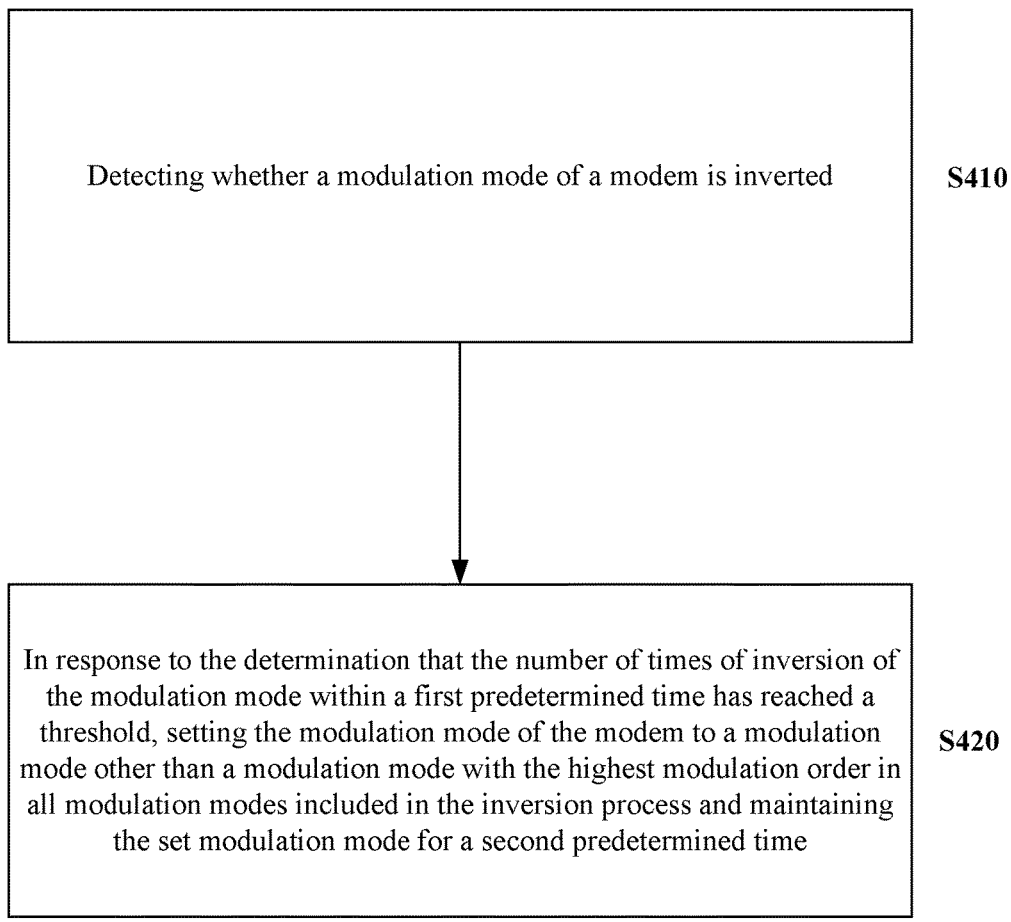
FIG. 4 is a flowchart of a method for setting modulation modes according to an embodiment of the present disclosure.

In order to avoid the problem that the modulation mode is constantly inverted, resulting in unstable data throughput and low overall data throughput, an embodiment of the present disclosure provides a method 400 for setting modulation modes shown in FIG. 4. The method 400 may be executed by the modem 110.

In 410, it is detected whether a modulation mode of a modem is inverted. The modem can operate in a plurality of modulation modes, and each modulation mode has a different modulation order.

As described above, the modulation mode may correspond to QAM-based OFDM modulation, and the modulation order of the modulation mode is the modulation order of QAM. When the modulation order of QAM becomes higher, the modulation order of the modulation mode also becomes higher, so that the modulation mode with a higher order can carry more bits each time the OFDM modulation is performed. At the same time, as the QAM corresponding to the high-order modulation mode has a high order, each point of the constellation diagram corresponds to more information bits, and the distance between the points is shorter, making it easier to be interfered by noise, resulting in a higher codeword error rate and thus bit error rate. When the channel conditions are not ideal, the use of a low-order modulation mode can achieve greater data throughput than a high-order modulation mode.

According to an embodiment of the present disclosure, when the modem 110 detects that its modulation mode is switched from a modulation mode of a first modulation order to a modulation mode of a second modulation order, and then to a modulation mode of a third modulation order, it determines that an inversion of the modulation mode has occurred, wherein, the second modulation order is smaller than each of the first modulation order and the third modulation order. It should be noted that the "first", "second", "third" and other descriptions used herein are only to indicate that they are different elements, and do not mean that they have a sequential relation and a magnitude relation. For example, the first modulation order and the third modulation order may be equal.

For example, assume that the modem 110 includes modes 0, 1, 2, and 3 in the sequence of increasing modulation orders. When the mode is switched from 2 to 0 and then to 2, it is determined that a mode inversion has occurred. When the mode is switched from 2 to 1 and then to 3, it is determined that an inversion has occurred. When the mode is switched from 2 to 0, 3, 1, and 3 in turn, it is determined that two inversions have occurred. The first inversion is where the mode is switched from 2 to 0, 3, and the second inversion is where the mode is switched from 3 to 1, 3. In the process of the mode switching from 2 to 0, the mode may be switched from 2 to 1 and then to 0. Those skilled in the art can understand that, for switching in the same direction (the order becomes monotonically lower or higher), it is only necessary to pay attention to the patterns at both ends of the switching process of the monotonic change.

In S420, in response to the determination that the number of times of inversion of the modulation mode within a first predetermined time has reached a threshold, the modulation mode of the modem is set to a modulation mode other than a modulation mode with the highest modulation order in all modulation modes included in the inversion process, and the set modulation mode is maintained for a second predetermined time.

The modem 110 may count the number of mode inversions within a first predetermined time T1. When it is detected that the number of mode inversions reaches the threshold set in advance within a time period not exceeding T1, the modem 110 forcibly maintains the modulation mode at a modulation mode with a lower order for a second predetermined time T2 so as to avoid the modulation mode from constantly inverting and affecting the data throughput.

T2 may be achieved by setting a hold-down timer. When the modem 110 forcibly sets a modulation mode with a lower order, the hold-down timer starts counting, and the current modulation mode cannot be changed before the timer expires. The current modulation mode cannot be changed even if the modem 110 determines that it can switch to a modulation mode with a higher order according to the test data.

For example, T1 may be 5 minutes, the threshold may be 3 times, and T2 may be 30 minutes. When three mode inversions are detected within 5 minutes (for example, the third mode inversion is completed in the third minute), the modem 110 maintains the mode at a lower order mode and keeps it for 30 minutes. If the inversion process includes modes 0 to 3, the forcedly set mode may be selected as mode 0, 1, or 2, as long as it is not the highest order mode included in the inversion process. Although T1, the threshold, and T2 are described with specific numeric values, T1, the threshold, and T2 may also be other values, and they can be flexibly set as needed. For example, T1 may also be 3 minutes, 8 minutes, 10 minutes, etc., the threshold may be 2 times, 4 times, etc., and T2 may be 10 minutes, 20 minutes, 1 hour, etc.

Figure 5:
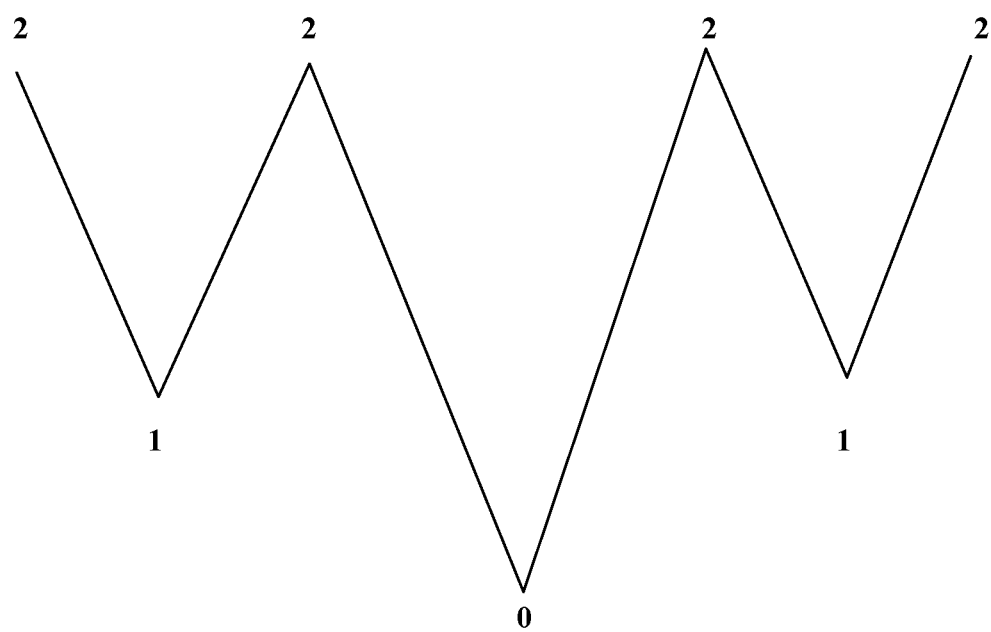
FIG. 5 is an example of a modulation mode inversion process according to an embodiment of the present disclosure.

According to an embodiment of the present disclosure, when setting a modulation mode with a lower order in S420, the modem 110 may set its modulation mode to a modulation mode with the lowest modulation order included in the last inversion. FIG. 5 shows an example of a modulation mode inversion process. As shown in FIG. 5, the modulation mode of the modem 110 is sequentially changed from mode 2 to 1, 2, 0, 2, 1, and 2, wherein the modulation order of the modulation mode increases in the sequence of 0, 1, and 2. When it is detected that the modulation mode has inverted three times as a predetermined threshold within T1, the modem 110 may set the modulation mode to the modulation mode with the lowest order in the last inversion so as to make the modulation mode more likely to adapt to the current channel conditions. Here, the last inversion in the three-inversion process is from mode 2 to mode 1 and then to mode 2, and thus the modem 110 fixedly sets the modulation mode to mode 1 and maintains mode 1 for the time period T2.

According to an embodiment of the present disclosure, when setting a modulation mode with a lower order in S420, the modem 110 may also set its modulation mode to a modulation mode with the lowest modulation order in all modulation modes included in the inversion process. In the example shown in FIG. 5, the modem 110 may set the inversion mode to mode 0. In this way, by fixing the modulation mode at the lowest order mode, it is possible to ensure that, in the relatively long time T2, the data throughput will be more stable without being influenced by channel noise changes, and the tolerance to changing channels will not be sacrificed for pursuing higher throughput.

According to an embodiment of the present disclosure, the modulation mode of the modem is set to the modulation mode with the lowest modulation order in all the modulation modes included in the inversion process when, during the inversion process, there is a switch from a modulation mode with the lowest modulation order included in the last inversion to a modulation mode with the lowest modulation order in all the modulation modes included in the inversion process. When there is no such situation during the inversion process, the modulation mode of the modem may be set to the modulation mode with the lowest modulation order included in the last inversion.

For example, in the example shown in FIG. 5, in the inversion process with a threshold number of times (switching from mode 2 to 1, 2, 0, 2, 1, and 2 in sequence), the lowest order mode in the last inversion (mode 2 to 1 to 2) is mode 1, and the lowest order mode included in all inversions is mode 0. As there is no switch from mode 1 to mode 0, the modulation mode is set to the lowest order mode 1 included in the last inversion to better suit the current channel conditions.

Figure 6:
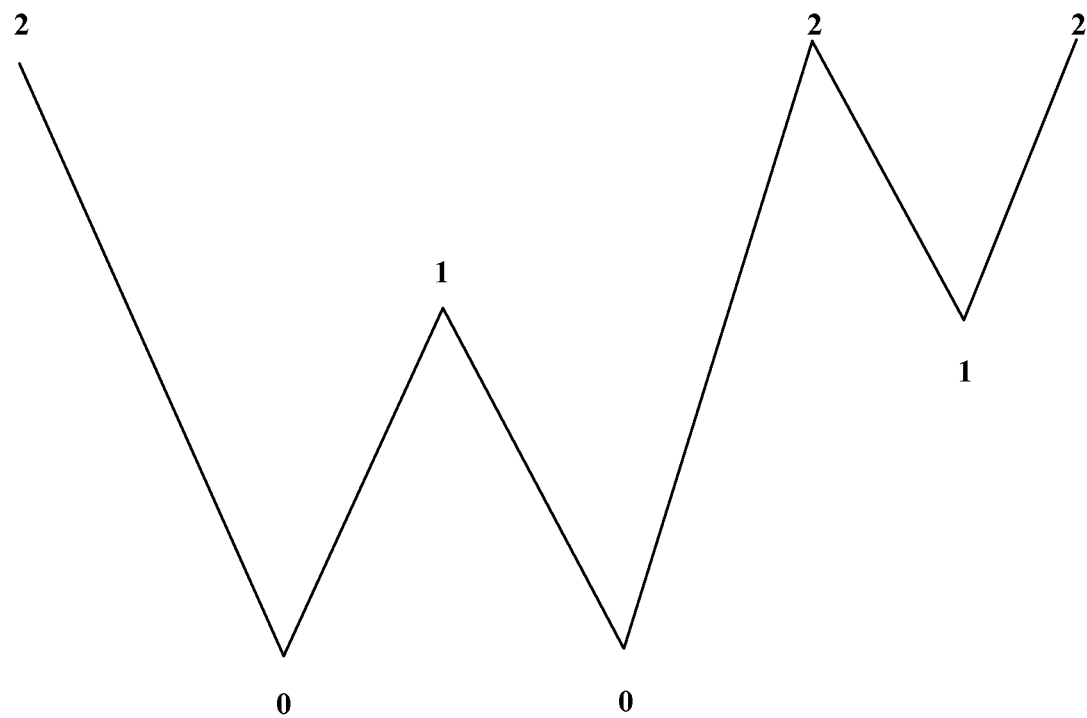
FIG. 6 is another example of a modulation mode inversion process according to an embodiment of the present disclosure.

FIG. 6 shows another example of a modulation inversion process. As shown in FIG. 6, the modulation mode of the modem 110 is sequentially changed from mode 2 to 0, 1, 0, 2, 1, and 2, wherein the modulation order of the modulation mode increases in the sequence of 0, 1, and 2. The lowest order mode in the last inversion (mode 2 to 1 to 2) is mode 1, and the lowest order mode included in all inversions is mode 0. As the switch from 1 to 0 is involved in the inversion process, it is preferable to determine the mode to be set and maintained as mode 0 instead of the lowest order mode 1 in the last inversion. The reason for this is as follows. As there is a switch from the next lowest order mode to the lowest order mode, it means that the next lowest order mode is not a stable mode, and it will also be affected by the current channel noise to have a higher codeword error rate, otherwise there would not be a switch from the next lowest order mode to the lowest order mode. If the modulation mode of the modem 110 is kept in an unstable mode, the data throughput will be affected by the changing channel and will be unstable and will decrease. By setting the modulation mode to and maintaining it at the lowest order mode, the stability and a relatively high level of the data throughput can be determined.

According to the above method, when it is determined that the number of times of inversion of the modulation mode within the first predetermined time has reached the threshold, by setting and maintaining the modulation mode at a modulation mode with a lower modulation order for the second predetermined time, it is possible to prevent the modulation mode from constantly inverting, and it is possible to keep the downstream data throughput at a higher level as compared with the high-order modulation mode which has low throughput due to the influence of noise.

Although the above description is made as to how to set modulation modes by taking three modes as an example, those skilled in the art can understand that when the modem has two, four, five or other number of modulation modes, the method provided in the present specification can also be used to set the modulation modes to maintain a high and stable data throughput.

Figure 7:
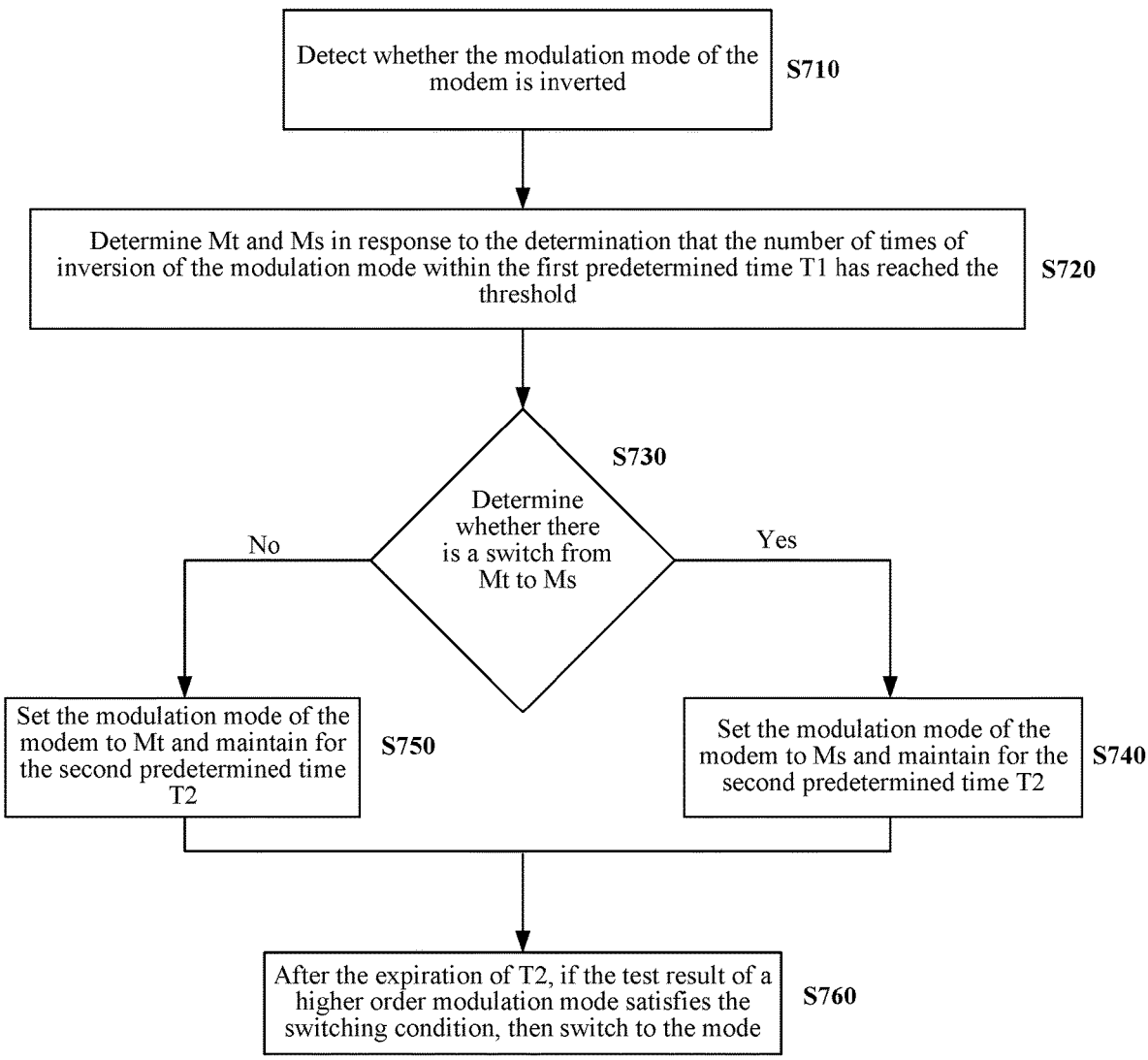
FIG. 7 is a flowchart of another method for setting modulation modes according to an embodiment of the present disclosure.

FIG. 7 is a flowchart of another method 700 for setting modulation modes according to an embodiment of the present disclosure. The method 700 may be executed by the modem 110.

In S710, it is detected whether the modulation mode of the modem 110 is inverted. This step is similar to S410.

In S720, in response to the determination that the number of times of inversion of the modulation mode within the first predetermined time T1 has reached the threshold, the modulation mode with the lowest modulation order included in the last inversion in the inversion process is determined and denoted as Mt, and the modulation mode with the lowest modulation order in all the modulation modes included in the inversion process is determined and denoted as Ms.

In S730, it is determined whether there is a switch from Mt to Ms in the inversion process. If yes, the method proceeds to S740, otherwise proceeds to S750.

In S740, the modulation mode of the modem is set to Ms and maintained for the second predetermined time T2.

In S750, the modulation mode of the modem is set to Mt and maintained for the second predetermined time T2.

In S760, after the expiration of the second predetermined time T2, if a test result of a modulation mode with a modulation order higher than the modulation order of the set modulation mode by the modem 110 satisfies a switching condition, the modulation mode of the modem 110 will be switched from the set modulation mode to the modulation mode with the modulation order higher than the modulation order of the set modulation mode.

As described above, the modem 110 can evaluate the performance of each modulation mode based on the test data sent by the local end device 120. After the expiration of T2, when the codeword error rate or bit error rate of the modulation mode with a higher order obtained based on the test data is lower than the threshold, the modem 110 may switch to the modulation mode with a higher order to improve information transmission efficiency. For example, after the modem 110 is maintained in the mode 0 for the time T2, if the modem 110 determines that the codeword error rate or bit error rate of mode 1 is lower than the predetermined corresponding threshold according to the test data, then it can switch to mode 1. If the modem 110 determines that the codeword error rates or bit error rates of mode 1 and mode 2 are all lower than the predetermined corresponding threshold according to the test data, then it can switch to mode 2 with a faster transmission rate. It is possible to further improve the downstream data throughput by attempting to restore an available modulation mode after a predetermined time.

By adopting the above method, the modem can set the modulation mode more reasonably after detecting that the number of mode inversions reaches the threshold within the predetermined time, thereby maintaining the downstream data throughput as high as possible.

The present disclosure may be realized as any combination of devices, systems, integrated circuits, and computer programs on non-transitory computer-readable media. One or a plurality of processors can be realized as an integrated circuit (IC), an application specific integrated circuit (ASIC) or a large-scale integrated circuit (LSI), a system LSI, or a super LSI or super LSI component that performs part or all of the functions described in this disclosure.

The present disclosure includes the use of software, applications, computer programs, or algorithms. Software, application programs, computer programs or algorithms can be stored on a non-transitory computer-readable medium, so that a computer with one or a plurality of processors can execute the aforementioned steps and the steps described in the attached drawings. For example, one or more memories save software or algorithms via executable instructions, and one or more processors may associate a set of instructions executing the software or algorithms to keep the downstream data throughput from the local end device to the modem stable in any number of networks according to the embodiments described in the present disclosure.

Software and computer programs (also called programs, software applications, applications, components, or codes) include machine instructions for programmable processors, and may be realized in high-level procedural languages, object-oriented programming languages, functional programming languages, logic programming languages, or assembly languages or machine languages. The term "computer-readable medium" refers to any computer program product, apparatus or device used to provide machine instructions or data to the programmable data processor, e.g., magnetic disks, optical disks, solid-state storage devices, memories, and programmable logic devices (PLDs), including computer-readable media that receive machine instructions as computer-readable signals.

For example, the computer-readable medium may include the dynamic random access memory (DRAM), random access memory (RAM), read only memory (ROM), electrically erasable read only memory (EEPROM), compact disk read only memory (CD-ROM) or other optical disk storage devices, magnetic disk storage devices or other magnetic storage devices, or any other medium that can be used to carry or store the required computer-readable program codes in the form of instructions or data structures and can be accessed by a general or special computer or a general or special processor. As used herein, magnetic disks or disks include compact discs (CDs), laser disks, optical disks, digital versatile discs (DVDs), floppy disks, and Blu-ray disks, wherein magnetic disks usually copy data magnetically, and disks copy data optically via laser. Combinations of the above are also included in the scope of computer-readable media.

In one or a plurality of embodiments, the use of the words "able", "can", "operable as" or "configured as" refers to some devices, logics, hardware and/or components designed to be used in a specified manner. The subject matter of the present disclosure is provided as an example of the apparatus, system, method, and program for performing the features described in the present disclosure. However, in addition to the aforementioned features, other features or modifications can be expected. It can be expected that any emerging technology that may replace any of the aforementioned realization technologies may be used to complete the realization of the components and functions of the present disclosure.

In addition, the above description provides examples without limiting the scope, applicability, or configuration set forth in the claims. Without departing from the spirit and scope of the present disclosure, changes may be made to the functions and layouts of the discussed components. Various embodiments may omit, substitute, or add various processes or components as appropriate. For example, features described with respect to some embodiments may be combined in other embodiments.

Similarly, although operations are depicted in a specific order in the attached drawings, this should not be understood as a requirement that such operations should be executed in the specific order shown or in the sequential order, or that all illustrated operations be executed to achieve the desired result. In some cases, multi-tasking and parallel processing can be advantageous.

The invention claimed is:

1. A modem, including
a memory, in which an instruction is stored; and
a processor, configured to execute the instruction stored in the memory to cause the modem to execute the following operations:
detecting whether a modulation mode of the modem is inverted, the modem being capable of operating in a plurality of modulation modes, and each modulation mode having a different modulation order; and
in response to the determination that the number of times of inversion of the modulation mode within a first predetermined time has reached a threshold, setting the modulation mode of the modem to a modulation mode with a lowest modulation order in all modulation modes included in the inversion process and maintaining the set modulation mode for a second predetermined time.

2. The modem according to claim 1, wherein,
the modulation mode corresponds to quadrature amplitude modulation (QAM)-based OFDM modulation, and the modulation order of the modulation mode is the modulation order of QAM.

3. The modem according to claim 1, wherein, the processor is further configured to execute the instruction stored in the memory to cause the modem to execute the following operation:
determining that an inversion of the modulation mode has occurred when it is detected that the modulation mode of the modem is switched from a modulation mode of a first modulation order to a modulation mode of a second modulation order, and then to a modulation mode of a third modulation order,
wherein, the second modulation order is smaller than each of the first modulation order and the third modulation order.

4. The modem according to claim 1, wherein, the processor is further configured to execute the instruction stored in the memory to cause the modem to execute the following operation:
setting the modulation mode of the modem to a modulation mode with the lowest modulation order included in the last inversion.

5. The modem according to claim 1, wherein the setting the modulation mode of the modem to a modulation mode with the lowest modulation order in all modulation modes included in the inversion process comprises switching from a next lowest order mode to a lowest order mode.

6. The modem according to claim 5, wherein, the processor is further configured to execute the instruction stored in the memory to cause the modem to execute the following operation:
setting the modulation mode of the modem to the modulation mode with the lowest modulation order in all the modulation modes included in the inversion process if during the inversion process, there is a switch from a modulation mode with the lowest modulation order included in the last inversion to a modulation mode with the lowest modulation order in all the modulation modes.

7. The modem according to claim 1, wherein, the processor is further configured to execute the instruction stored in the memory to cause the modem to execute the following operation:
after the expiration of the second predetermined time, if a test result of a modulation mode with a modulation order higher than the modulation order of the set modulation mode by the modem satisfies a switching condition, the modulation mode of the modem will be switched from the set modulation mode to the modulation mode with the modulation order higher than the modulation order of the set modulation mode.

8. A method for setting a modulation mode, including:
detecting by a modem whether a modulation mode of the modem is inverted, the modem being capable of operating in a plurality of modulation modes, and each modulation mode having a different modulation order; and
in response to the determination that the number of times of inversion of the modulation mode within a first predetermined time has reached a threshold, setting by the modem the modulation mode of the modem to a modulation mode with a lowest modulation order in all modulation modes included in the inversion process and maintaining the set modulation mode for a second predetermined time.

9. The method according to claim 8, wherein,
the modulation mode corresponds to quadrature amplitude modulation (QAM)-based OFDM modulation, and the modulation order of the modulation mode is the modulation order of QAM.

10. The method according to claim 8, wherein detecting whether the modulation mode of the modem is inverted includes:
   determining by the modem that an inversion of the modulation mode has occurred when it is detected that the modulation mode of the modem is switched from a modulation mode of a first modulation order to a modulation mode of a second modulation order, and then to a modulation mode of a third modulation order,
   wherein, the second modulation order is smaller than each of the first modulation order and the third modulation order.

11. The method according to claim 8, wherein, the setting the modulation mode of the modem to a modulation mode other than a modulation mode with the highest modulation order in all modulation modes included in the inversion process comprises switching from a next lowest order mode to a lowest order mode.

12. The method according to claim 8, wherein, setting the modulation mode of the modem to a modulation mode other than a modulation mode with the highest modulation order in all modulation modes included in the inversion process includes:
   setting the modulation mode of the modem to a modulation mode with the lowest modulation order in all modulation modes included in the inversion process.

13. The method according to claim 12, wherein, setting the modulation mode of the modem to a modulation mode with the lowest modulation order in all modulation modes included in the inversion process includes:
   setting the modulation mode of the modem to the modulation mode with the lowest modulation order in all the modulation modes included in the inversion process if during the inversion process, there is a switch from a modulation mode with the lowest modulation order included in the last inversion to a modulation mode with the lowest modulation order in all the modulation modes.

14. The method according to claim 8, further including:
   after the expiration of the second predetermined time, if a test result of a modulation mode with a modulation order higher than the modulation order of the set modulation mode by the modem satisfies a switching condition, the modulation mode of the modem will be switched by the modem from the set modulation mode to the modulation mode with the modulation order higher than the modulation order of the set modulation mode.

15. A non-transitory computer-readable medium having an instruction stored therein, when executed by a processor, the instruction causing the processor to execute operations including the following:
   detecting whether a modulation mode of a modem is inverted, the modem being capable of operating in a plurality of modulation modes, and each modulation mode having a different modulation order; and
   in response to the determination that the number of times of inversion of the modulation mode within a first predetermined time has reached a threshold, setting the modulation mode of the modem to a modulation mode with a lowest modulation order in all modulation modes included in the inversion process and maintaining the set modulation mode for a second predetermined time.

16. The non-transitory computer-readable medium according to claim 15, wherein, when executed by the processor, the instruction causes the processor to further execute operations including the following:
   determining that an inversion of the modulation mode has occurred when it is detected that the modulation mode of the modem is switched from a modulation mode of a first modulation order to a modulation mode of a second modulation order, and then to a modulation mode of a third modulation order,
   wherein, the second modulation order is smaller than each of the first modulation order and the third modulation order.

17. The non-transitory computer-readable medium according to claim 15, wherein, when executed by the processor, the instruction causes the processor to further execute operations including the following:
   setting the modulation mode of the modem to a modulation mode with the lowest modulation order included in the last inversion.

18. The non-transitory computer-readable medium according to claim 15, wherein the setting the modulation mode of the modem to a modulation mode with the lowest modulation order in all modulation modes included in the inversion process comprises switching from a next lowest order mode to a lowest order mode.

19. The non-transitory computer-readable medium according to claim 15, wherein, when executed by the processor, the instruction causes the processor to further execute operations including the following:
   after the expiration of the second predetermined time, if a test result of a modulation mode with a modulation order higher than the modulation order of the set modulation mode by the modem satisfies a switching condition, the modulation mode of the modem will be switched from the set modulation mode to the modulation mode with the modulation order higher than the modulation order of the set modulation mode.

20. The non-transitory computer-readable medium according to claim 15, wherein the modulation mode corresponds to quadrature amplitude modulation (QAM)-based OFDM modulation, and the modulation order of the modulation mode is the modulation order of QAM.

* * * * *